INVENTORS
SHERRIL A. HARMON
JOHN A. LAURENT

United States Patent Office 3,243,796
Patented Mar. 29, 1966

3,243,796
THREE-PHASE VOLTAGE UNBALANCE
DETECTOR
Sherril A. Harmon, Phoenix, Ariz., and John A. Laurent, Pittsfield, Mass., assignors, by mesne assignments, to the United States of America as represented by the Secretary of the Navy
Filed Apr. 29, 1963, Ser. No. 276,673
7 Claims. (Cl. 340—253)

The present invention relates to rectifier circuits, and more particularly to a three-phase rectifier network which incorporates means for indicating an unbalanced condition thereof.

Certain utilization circuits are now in use which employ three-phase inputs, wherein the "loss" of one particular line does not necessarily means that the voltage of the affected line is reduced to zero. Instead, this voltage may remain at a relatively high percentage of its nominal value. Although many arrangements are available which are capable of indicating when the voltage of any one line does drop appreciably, nevertheless these arrangements are almost invariably insensitive to less severe changes in input conditions, as when the voltage of the line under consideration remains at some relatively high proportion (such as 85 percent, for example) of its operating value. Under such circumstances, the usual indicating circuits often fail to properly monitor the operating status of the system.

According to a feature of the present invention, an indicator is provided for a three-phase bridge rectifier which is responsive to only a slight degree of unbalance of the output voltages. The manner in which this disclosed arrangement operates is by sensing the magnitude of the three-phase ripple voltage. When the three phases are balanced, this ripple voltage is small, and the indicating circuit remains inactive. However, when the three phases become unbalanced by the "loss" of one line, the ripple voltage magnitude increases until a predetermined threshhold is reached. At this point, the sensing circuit is energized and presents an indication to an observer.

One object of the present invention, therefore, is to provide a circuit arrangement for indicating any unbalance which may exist in a three-phase bridge rectifier.

Another object of the invention is to provide a circuit which will provide an instantaneous indication of the loss of one line of a three-phase bridge rectifier, even through the voltage in the affected line remains at a significant proportion of its original value.

Figure 1:
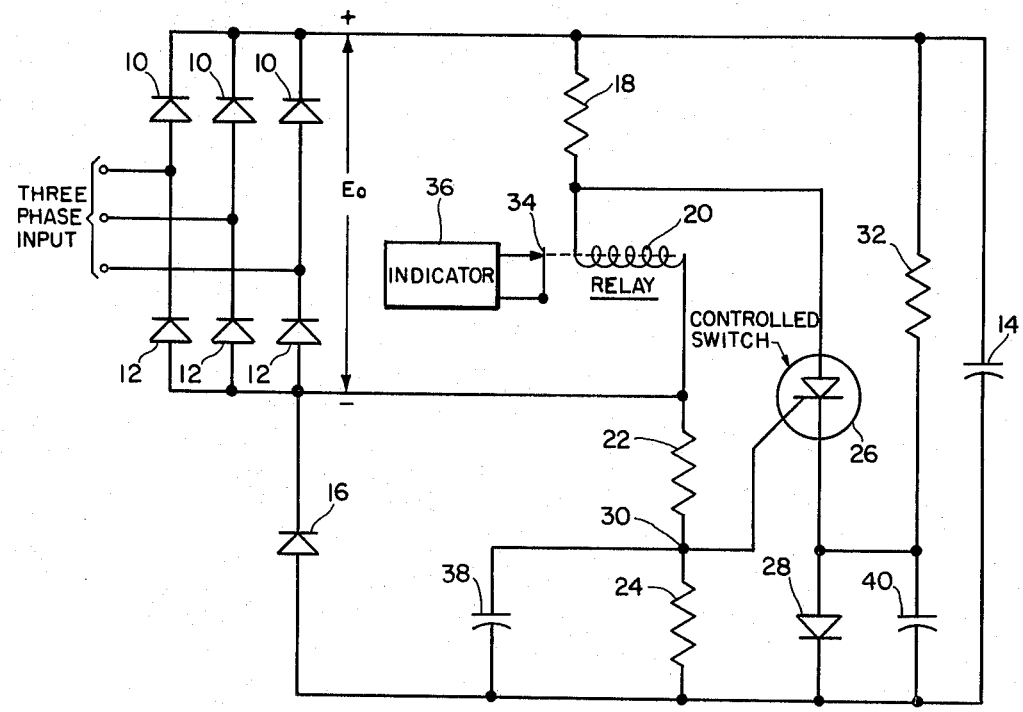
Figure 2:
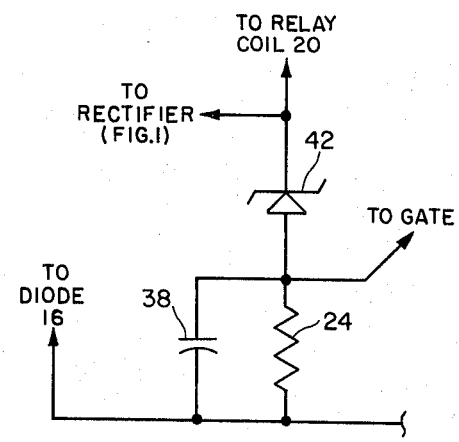

Other objects and many of the attendant advantages of this invention will be readily appreciated as the same becomes better understood by reference to the following detailed description when considered in connection with the accompanying drawings, wherein:

FIG. 1 is a circuit diagram of a three-phase rectifier circuit incorporating an indicating network designed in accordance with the principles of the present invention; and FIG. 2 is a schematic illustration of a modification of a portion of the circuit of FIG. 1.

Referring now to FIG. 1 of the drawings, a more or less conventional rectifier arrangement is illustrated which is made up of three pairs of diodes 10 and 12 connected as shown in the drawing, with the voltage output $E_0$ thereof having the polarity indicated. The three-phase input to the rectifier network may be taken in the usual fashion from the respective windings of a poly-phase transformer (not shown). As is well known in the art, the ripple component in the rectifier output $E_0$ normally has a value of approximately six percent, and it is with the variation in this ripple voltage upon "loss" of one of the input lines that the present invention is concerned, particularly when the input lines so affected drop only to approximately 85 percent of its original value.

The circuit of FIG. 1 of the drawings includes a capacitor 14 connected in series with a diode 16. The components 14 and 16 comprise a peaking filter, and the ripple voltage during operation of the system appears across diode 16. In accordance with the invention, the instantaneous voltage output of the rectifier is subtracted from the rectifier peak voltage, and the means for sensing this voltage difference includes a voltage-dropping power resistor 18 in series relationship with a high-impedance relay winding 20 and a voltage-divider network made up of two series-connected resistor 22 and 24. As shown, the voltage-divider network 22, 24 is connected across the peaking diode 16 in order to obtain a desired portion of the ripple voltage.

A controlled switch, such as a silicon-controlled rectifier (SCR) is identified by the reference numeral 26 in the drawing. It is connected in series with a biasing diode 28 to the negative side of the voltage divider, and also so that the components 26, 28 are in shunt with the elements 20, 22, 24. The gate, or control electrode, of the switch 26 is connected to a point 30 intermediate the two resistors 22, 24. A constant current is supplied to the biasing diode 28 through a still further resistor 32 connected to the positive side of the rectifier network 10, 12. It has been found in practice that the biasing diode 28 should preferably be chosen so that the forward drop creased thereby maintains the cathode voltage of the silicon-controlled rectifier 26 at a value of approximately .5 volt. Under such circumstances, it has been further found that the peak value of the voltage appearing at point 30 (the gate voltage of switch 26) is approximately .3 volt in a balanced situation. Consequently, the gate-to-cathode voltage of switch 26 is such that the switch is reverse-biased by about .2 volt.

In operation, when the three-phase input voltages become unbalanced, the ripple voltage as developed across the peaking diode 16 increases. This increase in voltage also appears across the voltage divider 22, 24, and hence the gate potential at point 30 is raised. When this rise in gate potential overcomes the forward drop of the biasing diode 28 and reaches the firing potential of the switch 26, the latter becomes conductive to provide a low-impedance shunt path around the relay winding 20, deenergizing the relay and opening the contacts 34. This change in circuit status may be presented to an observer by some conventional form of indicator 36.

It should be recognized that once the switch 26 has been placed in conductive condition, the gate loses control, and any recovery of the circuit to a balanced situation will not open the switch. To restore normal operating conditions, it is necessary to completely turn off the three-phase input power. This reduces the current through the switch 26 below its "holding" value and restores gate control thereto. When the input power is again applied, the switch 26 will be non-conducting (if the three-phase voltages are now balanced) and the gate will again have control. In this connection, it should be noted that restoration of input power must be so carried out that all three phases are energized simultaneously, as otherwise an unbalance would be created and the switch 26 closed at a time when such action is not desired.

A further capacitor 38 is connected across the gate resistor 24 to filter the gate signal and also to provide a path for noise transients which might otherwise fire the switch 26 if they are of sufficient magnitude. In the same manner, a capacitor 40 shunts the biasing diode 28 to maintain the forward voltage drop of this diode under transient conditions.

It will be recognized that the various capacitors and time-constant networks of the circuit of FIG. 1 should be chosen to operate in accordance with the particular frequency of the three-phase input. If this frequency should change, a modification in the value of these components must be made to maintain circuit efficiency. For example, if the source frequency should increase, the peaking capacitor 14 is better able to retain its peak voltage, and consequently the error voltage across the voltage divider 22, 24 is larger. As a result, a reduced value is required for the gate resistor 24 in order to maintain the same negative bias between the gate and cathode of the switch 26.

Under certain conditions, it may be necessary to interpose a resistance-capacitance filter between the rectifier assembly 10, 12 and the source. However, this is only desirable when transients of considerable magnitude are present or anticipated, and under a majority of conditions no such filter is required. Furthermore, if the input voltages are somewhat unbalanced inherently, the employment of capacitors between the respective lines of the three-phase input will yield improved stability of operation.

Although the circuit values of the various components employed in the unbalance detector of FIG. 1 are obviously chosen in accordance with the conditions under which they are intended to operate, it has been found in practice that satisfactory performance is achieved when the following values are employed:

Resistor 22 _____ 14.7K.
Resistor 24 _____ 3.83K (for 60 cycle input).
Resistor 18 _____ 6.1K.
Resistor 32 _____ 1 meg.
Capacitor 14 _____ .22 µf.
Capacitor 38 _____ 3.9 µf.
Capacitor 40 _____ 1 µf.
Diodes 10, 12 and 16 _____ 1N647 (Texas Inst.).
Diode 28 _____ 1N457 (Hughes).
Silicon-controlled switch 26 _ #3A60 (Solid-State Prod.).

By replacing the resistor 22 of FIG. 1 with a breakdown (zener) diode 42 as shown in FIG. 2, the attenuator 22, 24 is changed from a linear device to a non-linear device. Ripple levels corresponding to normal operation are considerably below the firing level of zener diode 42; therefore the voltage across resistor 24 is zero or very low and switch 26 is biased off by the voltage drop across the diode 28. When an unbalance occurs, the ripple increases, firing the zener diode 42. This increases the voltage across resistor 24 and causes the switch 26 to close.

The unbalance necessary to close switch 26 is almost entirely dependent on the zener voltage of the zener diode, and this factor is predictable. Also, current through the zener diode is a function of circuit impedance and hence controllable. For example, it may be reduced by a resistor (not shown) connected in series with the zener diode.

Obviously many modifications and variations of the present invention are possible in the light of the above teachings. It is therefore to be understood that within the scope of the appended claims the invention may be practiced otherwise than as specifically described.

We claim:
1. A circuit for indicating any unbalance which may develop in a three-phase bridge rectifier as a result of the voltage in one of the three input lines to the rectifier dropping appreciably below its normal value, said circuit comprising:
 (a) an energy-storage device upon which is developed the peak voltage output of the rectifier under normal operating conditions
 (b) a peaking diode connected in series with said energy-storage device across the output of said rectifier, the ripple voltage of said system appearing across said peaking diode during normal operation
 (c) a relay through the coil of which current flows during normal operation of said circuit
 (d) a controlled switch shunting the coil of said relay, said switch having a gate electrode
 (e) means for applying a portion of the ripple voltage which appears across said peaking diode to the gate electrode of said controlled switch to maintain the latter in open circuit condition during normal operation of said circuit, and
 (f) an indicator energized upon deenergization of the coil of said relay,
 (g) whereby upon the creation of an unbalance in said circuit as a result of the voltage in one of the three input lines to said rectifier dropping appreciably below its normal value, the ripple voltage developed across said peaking diode will increase to increase the voltage applied to the gate electrode of said controlled switch to cause the latter to close, thereby shunting the coil of said relay to deenergize the same and simultaneously energize said indicator.

2. A circuit in accordance with claim 1, further comprising a voltage-dropping power resistor and a voltage-divider, the coil of said relay being connected in series with both said power resistor and said voltage divider, the series combination of power resistor, voltage divider and relay coil being connected in parallel relationship with said energy-storage device.

3. The combination of claim 2, in which said controlled switch comprises a silicon-controlled rectifier.

4. The combination of claim 2, further comprising a biasing diode connected in series with said controlled switch, the series combination of biasing diode and controlled switch being connected in parallel relationship with the series combination of said voltage divider and the coil of said relay.

5. The combination of claim 4, in which the gate electrode of said controlled switch is connected to a point on said voltage divider.

6. The combination of claim 4, in which said voltage divider is connected in parallel relationship with said peaking diode.

7. A circuit for indicating any unbalance which may develop in a three-phase bridge rectifier as a result of the voltage in one of the three input lines dropping appreciably below its normal value, said circuit comprising:
 (a) an energy-storage device upon which is developed the peak voltage output of the rectifier under normal operating conditions
 (b) a peaking diode connected in series with said energy-storage device across the output of said rectifier, the ripple voltage of said system appearing across said peaking diode during normal operation
 (c) a relay through the coil of which current flows during normal operation of said circuit
 (d) a zener diode
 (e) a voltage-dropping power resistor
 (f) a biasing resistor
 (g) said relay coil, said zener diode, said voltage-dropping power resistor, and said biasing resistor all being connected in series relation across said energy-storage device
 (h) a controlled switch shunting the series combination of said relay coil, said zener diode and said biasing resistor, said controlled switch having a gate electrode
 (i) means for applying a portion of the ripple voltage which appears across said peaking diode to the gate electrode of said controlled switch to maintain the latter in open circuit condition during normal operation of said circuit, and
 (j) an indicator energized upon deenergization of said relay coil, (k) whereby upon the creation of an unbalance in said circuit as a result of the voltage in one of the three input lines to said rectifier dropping appreciably below its normal value, the ripple voltage developed across said peaking diode will increase to increase the voltage applied to the gate electrode of said controlled switch to cause the latter to close, thereby shunting the coil of said relay to deenergize the same and simultaneously energize said indicator.

No references cited.

NEIL C. READ, *Primary Examiner.*

D. K. MYER, *Assistant Examiner.*